April 1, 1924.

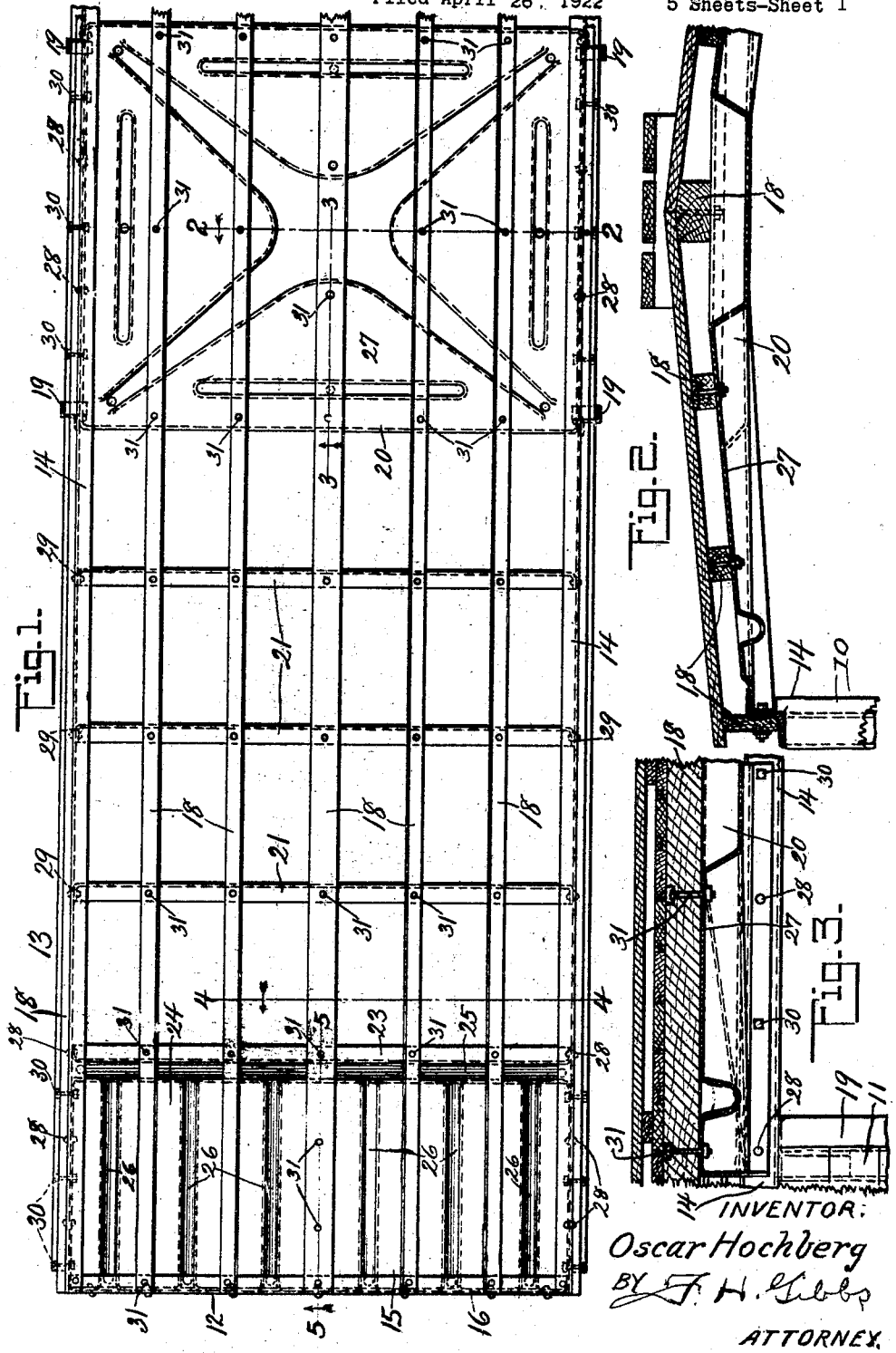

O. HOCHBERG

CAR FRAMING REENFORCEMENT

Filed April 26, 1922    5 Sheets-Sheet 2

1,488,676

INVENTOR:
Oscar Hochberg
BY F.H. Gibbs
ATTORNEY.

April 1, 1924.
O. HOCHBERG
CAR FRAMING REENFORCEMENT
Filed April 26, 1922
1,488,676
5 Sheets-Sheet 3
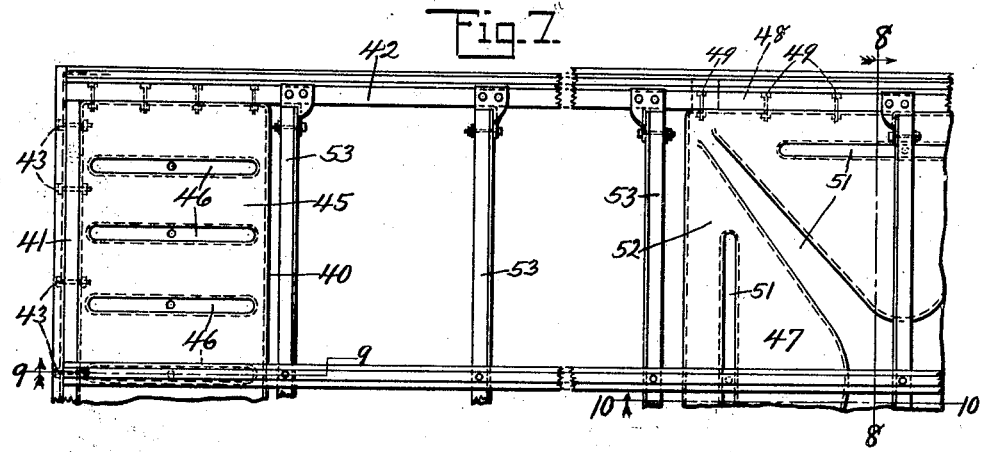
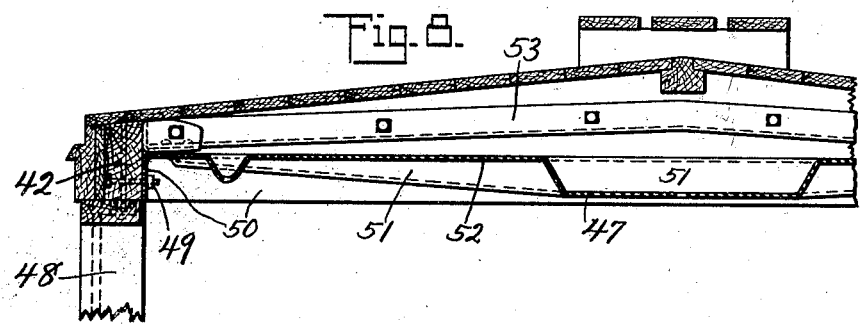
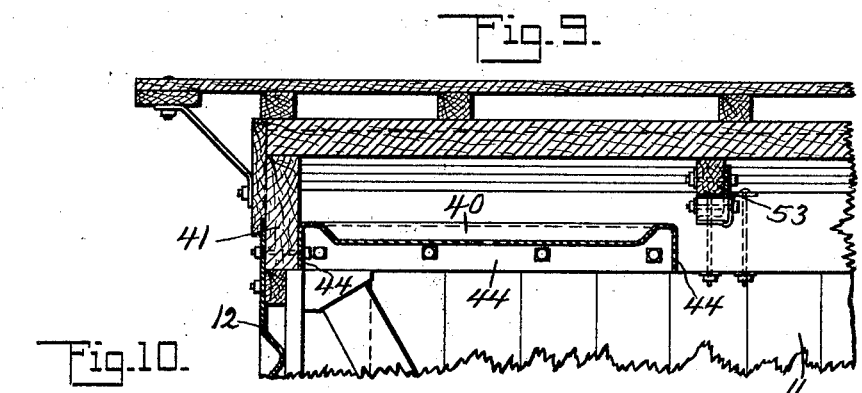
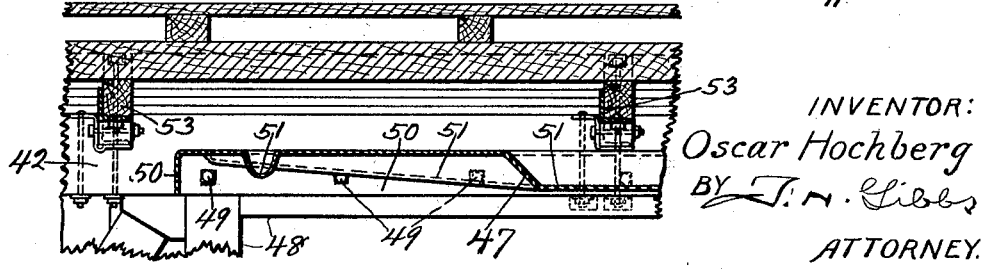
INVENTOR:
Oscar Hochberg
BY
ATTORNEY.

April 1, 1924.
O. HOCHBERG
CAR FRAMING REENFORCEMENT
Filed April 26, 1922   5 Sheets-Sheet 4
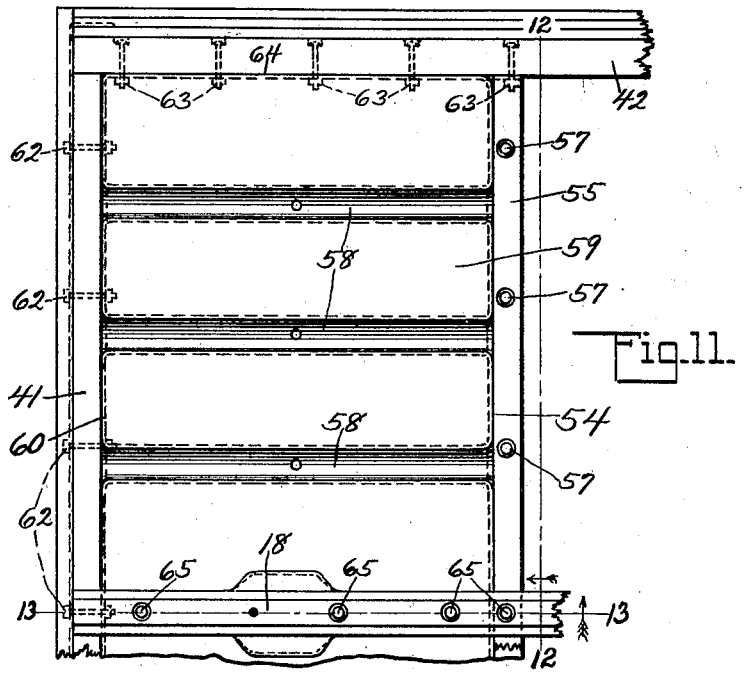
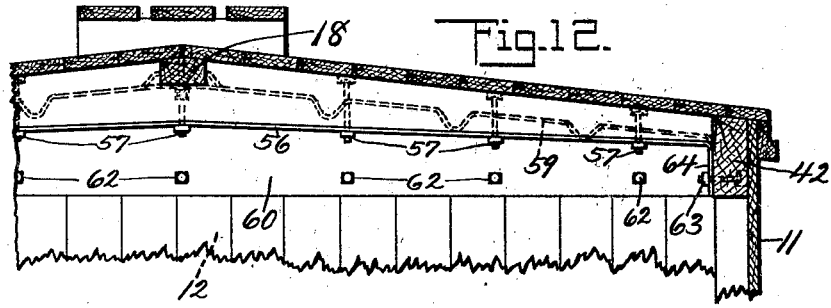
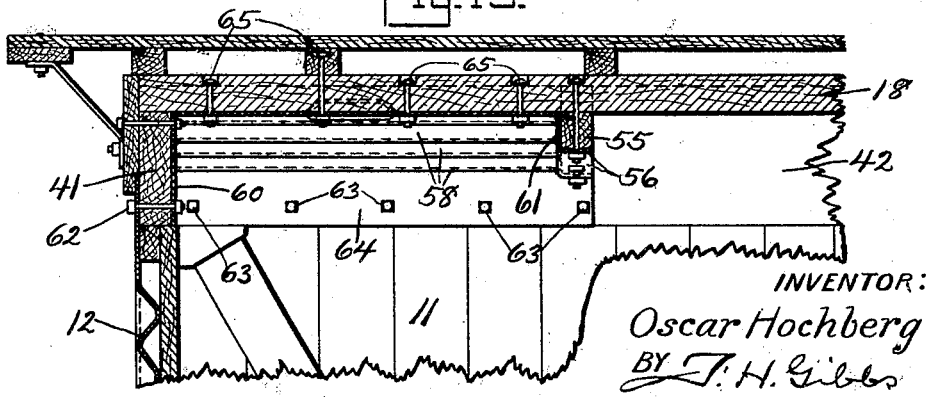
INVENTOR:
Oscar Hochberg
BY J. H. Gibbs
ATTORNEY.

April 1, 1924.

O. HOCHBERG 1,488,676

CAR FRAMING REENFORCEMENT

Filed April 26, 1922    5 Sheets-Sheet 5

INVENTOR:
Oscar Hochberg
BY
ATTORNEY.

Patented Apr. 1, 1924.

1,488,676

UNITED STATES PATENT OFFICE.

OSCAR HOCHBERG, OF NEW YORK, N. Y., ASSIGNOR TO AMERICAN CAR AND FOUNDRY COMPANY, OF NEW YORK, N. Y., A CORPORATION OF NEW JERSEY.

CAR-FRAMING REENFORCEMENT.

Application filed April 26, 1922. Serial No. 556,716.

*To all whom it may concern:*

Be it known that I, OSCAR HOCHBERG, residing at New York, in the county and State of New York, and being a citizen of the United States, have invented certain new and useful Improvements in Car-Framing Reenforcements, of which the following is a full, clear, and exact description, such as will enable others skilled in the art to which it appertains to make and use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is a plan view of the roof framing of a railway box car showing a preferred application of the invention;

Fig. 2 is a transverse sectional view through one of the elements of the framing reenforcement taken on line 2—2 of Fig. 1 looking in the direction indicated by the arrow;

Fig. 3 is a longitudinal sectional view through the same part taken on line 3—3 of Fig. 1 looking in the direction indicated by the arrow;

Fig. 7 is a fragmentary plan view of a portion of a car roof framing showing the application of a modified form of the invention to cars having wooden side and end plates;

Fig. 8 is a sectional view of the same on an enlarged scale taken on line 8—8 of Fig. 7 looking in the direction indicated by the arrow;

Fig. 9 is a longitudinal sectional view of an end member of said modified reenforcement taken on line 9—9 of Fig. 7 looking in the direction indicated by the arrow;

Fig. 10 is a similar view of an intermediate member of said modified reenforcement taken on line 10—10 of Fig. 7 looking in the direction indicated by the arrow;

Fig. 11 illustrates another modification of the end member of the reenforcement and is a fragmentary plan view of the roof framing showing the application of said end member to a carline, and side and end plates;

Fig. 12 is a transverse sectional view through the roof framing taken on line 12—12 of Fig. 11 looking in the direction indicated by the arrow and showing in elevation said modified end member of the reenforcement;

Fig. 13 is a longitudinal sectional view through said end member taken on line 13—13 of Fig. 11 looking in the direction indicated by the arrow;

Figure 4:
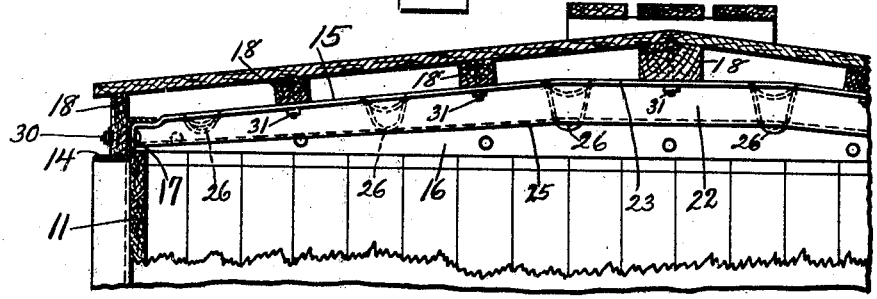
Fig. 4 is a transverse sectional view through the roof framing taken on line 4—4 of Fig. 1 looking in the direction indicated by the arrow and showing in elevation one of the end members of the framing reenforcement.

This invention relates to reenforcements for the upper framing of box and other railway house cars.

Among other objects of the invention are to provide means for reenforcing the upper framing members of a car body to prevent distortion and displacement thereof; to provide co-ordinating reenforcements at predetermined points within the car interior; and to provide an interior reinforcing system designed to minimize the racking and weaving of the parts at the framing joints.

In the drawings, 10 indicates the car framing as a whole, comprising side walls 11, end walls 12, and a roof structure 13. The roof framing is supported upon side plates 14 of the car and upon the end walls 12. With the side plates of the car forming part of the roof structure the several members of the reenforcement may be considered as forming part of the car framing and roof structure inasmuch as the parts are firmly connected and function as a unit.

Figure 5:
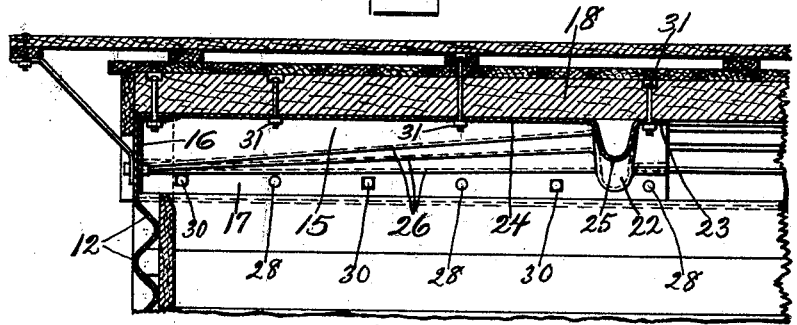
Fig. 5 is a longitudinal sectional view through said end reenforcing member taken on line 5—5 of Fig. 1 looking in the direction indicated by the arrow.
Figure 6:
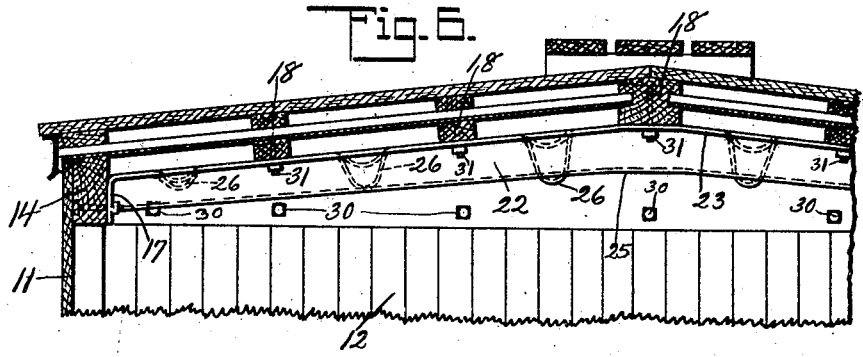
Fig. 6 is a vertical section taken transversely through a car having both inside and outside roofs and illustrating the application of the invention to such construction.

In the preferred embodiment of the invention the end members 15 of the reenforcement are secured to and form part of the end walls of the car. As shown in Figs. 1, 4, and 5, the end walls 12 are of metal and are secured along their upper margins to the diaphragm end members 15. The end diaphragms 15 are provided with downwardly extending end wall portions 16 for securing them to the end walls 12 and similar side plate portions 17 for connection with the side plates 14.

The diaphragms 15 are preferably pitched to the slope of the roof as shown and connected to the side plates 14 and other roof framing longitudinal members 18. Intermediate the end diaphragms 15 and adjacent the side door posts 19, are additional diaphragms 20 also secured to the side plates 14 and roof framing longitudinals 18. Thus connected, the end and intermediate diaphragms are co-ordinated to provide a reenforcement adapted to resist distortion of any of the framing members and distribute such localized stresses throughout the car framing. Between the end and intermediate diaphragms of the reenforcement are the usual roof carlines 21 of any approved design. In the area covered by the diaphragms, carlines are not used since the diaphragms themselves are designed to support those portions of the roof framing respectively overlying them.

The end diaphragms are formed with their inner marginal portions shaped to provide carlines 22 of flanged channel cross-section with the outer flanges 23 of the carlines spaced from the webs 24 of the diaphragms by the channel portions 25. The carlines merge at their ends with the side plate portions 17 of said diaphragms and are held against lateral distortion by means of the stiffening ribs 26 pressed out of the diaphragm webs 24. These ribs are spaced apart and tapered as shown in Figs. 1 and 5 and disposed with their deepest portions at the end wall flanges 16, becoming shallower as they approach the carline channel portions 25 with which they unite.

The intermediate diaphragms 20 are in like manner stiffened by ribs pressed out of the web portion 27 thereof. These ribs are disposed over the web area preferably as shown in Figs. 1, 2, and 3, to provide rigidity in the diaphragm at points subjected to pressure. Both end and intermediate diaphragms are preferably secured to the side plates 14 by rivets 28 or the like to insure the full development of the strength of the side plates and diaphragms in order that said reinforcing assembly, with or without the intermediate diaphragms, will operate as a unit in resisting vibrations set up during car movement. The roof framing is also secured to the side plates 14 by carlines 21 riveted at their ends 29 to said side plates and by bolts 30 extending horizontally through the diaphragms, side plates, and roof framing longitudinals 18. To further rigidify the roof framing as a whole, bolts 31 or the like are extended downwardly through the framing longitudinals 18 and the diaphragms and carlines respectively.

The invention may be adapted to cars having wooden side and end plates as illustrated in Figs. 7 to 16 inclusive. In Figs. 7 to 10 inclusive, the end diaphragms 40 are secured to the end plates 41 and side plates 42 by means of bolts 43. The diaphragms are pan shaped and are positioned with their marginal flanges 44 presented downwardly. To prevent distortion of said diaphragms the webs 45 thereof are provided with a series of ribs 46 spaced apart and disposed over the web area and extending preferably in a direction parallel to the side plates 42 and designed to distribute the forces operating on the end plates to the diaphragms and side plates. Additional capacity for resistance to distortion and displacement of said side and end plate members is obtained by the use of diaphragms 47 positioned intermediate the end diaphragms 40 and adjacent the side door openings 48 of the car. The intermediate diaphragms 47 are, like the end diaphragms 40, secured to the side plates by bolts 49 or like devices, and operate to prevent relative lateral and longitudinal movements of the side plates, thereby minimizing the weaving and racking stresses in the framing joints at points intermediate the car ends and promoting stability in the framing connections at the ends of the car.

The intermediate diaphragms 47, like the end diaphragms 40, are pan shaped and positioned with their marginal flanges 50 presented downwardly, and reinforced over their web areas by means of the stiffening ribs 51 pressed out of their webs 52 and so disposed as to rigidify the diaphragms as a whole. Unlike the diaphragms shown in Figs. 1 to 6 inclusive and 11 to 16 inclusive, the diaphragms shown in Figs. 7 to 10 inclusive do not support any part of the roof framing and are not pitched to the slope of the roof, but extend horizontally between the side and end plates of the car and in a plane below the carlines 53.

In adapting the invention to cars having wood side and end plates and carlines, the diaphragms 54 may be formed with marginal carline seats 56 for carlines 55 as shown in Figs. 11 to 13 inclusive. The diaphragms are secured to the carlines 55 by means of bolts 57 extending preferably through the roof framing longitudinals 18, carlines 55, and carline seats 56. Said diaphragms 54 are reinforced by means of ribs 58 pressed out of the web 59 and merging with the downwardly extending end plate flanges 60 and carline seat wall portions 61. The diaphragms 54 are further secured to the car by means of bolts 62 and 63 taking the end plate flanges 60 and side plate flanges 64. The diaphragms are also secured to the roof framing longitudinals 18 by bolts 65 or the like, taking the longitudinals 18 and webs 59 of the diaphragms. In such application of the invention the diaphragms 54 occupy the space between the end plates 41, side plates 42 and carlines 55 whereby the forces acting upon the end plate 41 will be distributed to the side plates 42, carlines 55, and roof framing longitudinals 18.

Figure 14:
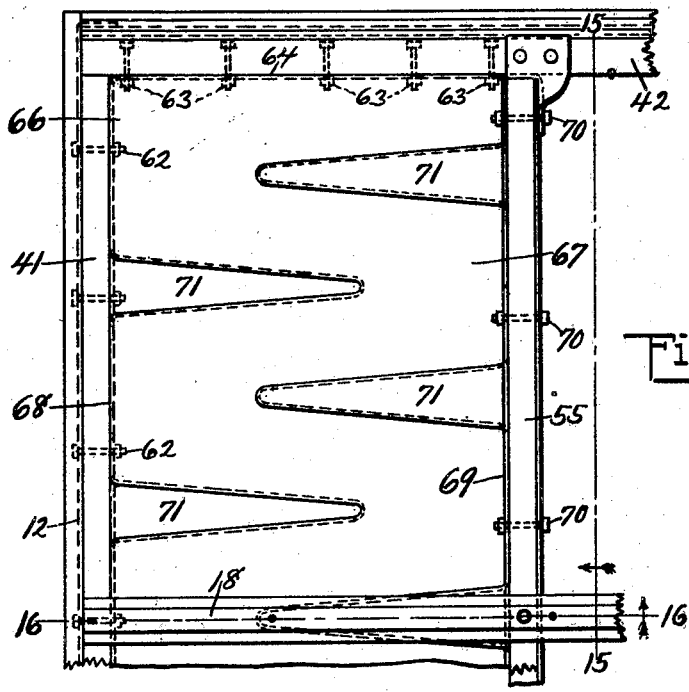
Fig. 14 is a view similar to Fig. 11 but showing a further modification of the end member of the reenforcement.
Figure 15:
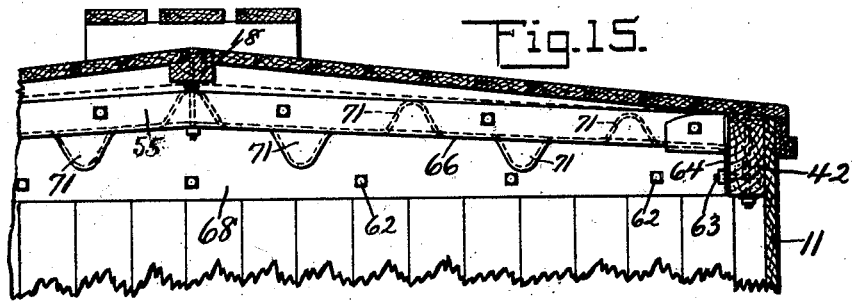
Fig. 15 is a transverse sectional view through the roof framing taken on line 15—15 of Fig. 14 looking in the the direction indicated by the arrow and showing said end member in elevation.
Figure 16:
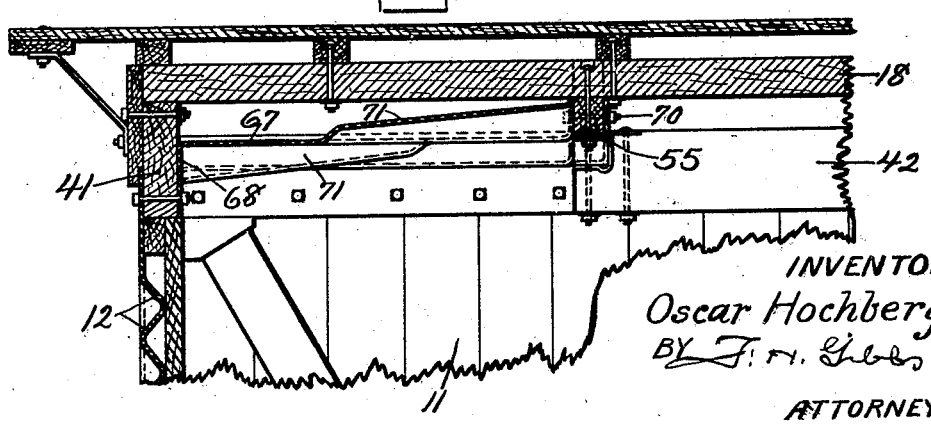
Fig. 16 is a longitudinal section through same taken on line 16—16 of Fig. 14 looking in the direction indicated by the arrow.

This embodiment of the invention may be further modified by forming the diaphragms as shown in Figs. 14 to 16 inclusive. Instead of the pan shaped diaphragm illustrated in Figs. 11, 12, and 13, diaphragms 66 are shaped to provide a pair of marginal flanges extending relatively in opposite directions from the webs 67 of the diaphragms. The end plate flanges 68 extend downwardly and are secured to end plates 41 of the car but the flanges 69 for attaching the diaphragms to the carlines 55 are presented upwardly and secured to the carlines by bolts 70. These diaphragms are reinforced by means of ribs 71 pressed out of the opposite faces of the webs 67 and merged with the flanges 68 and 69 on the respective sides of the webs. It will be noted that the ribs 71 do not extend the full width of the diaphragms but terminate short of the diaphragm margins opposite to the flanges with which said ribs 71 respectively merge. The ribs 71 are alternately disposed over the web area in spaced relation as shown in these figures and tapered to merge into the web 67 of the diaphragm at points beyond a line intersecting said ribs.

It will be noted that there has been provided a reinforcing system for bracing the upper frame-work of a car body designed to minimize the racking and weaving stresses imposed at localized points in the framing and distribute them to other and remote members of the car structure. The end members of the reinforcement have extended engagement with the side and end plates of the car whereby relative movement of the framing members and consequent weakening of the fastenings at points of connection is considerably reduced.

What I claim is:

1. In a railway car having end and side walls, metallic reinforcing diaphragms secured to the upper margins of said walls, and car framing side wall longitudinals connecting said diaphragms.

2. In car construction, a reenforcement comprising spaced diaphragms and longitudinal connecting members secured to said diaphragms along the side marginal edges thereof.

3. In railway car construction including side and end walls, spaced diaphragms connecting said side and end walls, and longitudinal side wall members connecting said diaphragms.

4. In car framing construction, metallic end walls, diaphragms secured to said walls, and roof framing and side wall longitudinals connecting said diaphragms.

5. In car framing construction including a pitched roof structure, a pair of spaced diaphragms shaped to conform to the slope of said roof structure, side plates connecting said diaphragms, and metallic end walls secured along their upper margins to said diaphragms.

6. In a railway car having metallic end walls, a pair of spaced diaphragms secured to the upper margins of said walls, and longitudinal framing members connecting said diaphragms along their marginal edges.

7. In a railway car having side and end walls, door openings in the car sides, a plurality of spaced diaphragms connecting said side and end walls, longitudinal side wall framing members connecting said diaphragms, and a diaphragm adjacent said door openings connecting said longitudinal framing members above the door openings.

8. In a car framing having a roof structure and side and end walls, a plurality of diaphragms spaced apart and connecting said roof structure and side and end walls, door openings in the side walls, longitudinal framing members connecting said diaphragms, and a diaphragm adjacent said door openings connecting said longitudinal framing members above the door openings.

9. In a car framing having a roof structure and side and end walls, a plurality of diaphragms spaced apart and connecting said roof structure and side and end walls, door openings in the side walls, and a diaphragm intermediate said first mentioned diaphragms adjacent to and above said door openings.

10. In a railway car having side and end walls, metallic diaphragms spaced apart and respectively secured to the upper margins of the end walls and extending from side to side of the car, and car framing side wall longitudinals connecting said diaphragms.

11. In a railway car having side and end walls, metallic diaphragms spaced apart and respectively secured to the upper margins of the end walls and extending from side to side of the car, car framing side wall longitudinals connecting said diaphragms, and an intermediate diaphragm connecting said framing longitudinals.

12. In a railway car having side and end walls, metallic diaphragms spaced apart and respectively secured to the upper margins of the end walls and extending from side to side of the car, a plurality of roof supporting carlines between said diaphragms, and car framing side wall longitudinals connecting said carlines and diaphragms.

13. In a car framing reenforcement comprising a pair of diaphragms spaced apart forming part of the roof structure of the car, a plurality of carlines intermediate said diaphragms, car framing side wall longitudinals connecting said carlines and diaphragms, and a diaphragm intermediate said carlines connecting said framing longitudinals.

In witness whereof I have hereunto set my hand in the presence of two witnesses.

OSCAR HOCHBERG.

Witnesses:
LORETTA McARDLE,
ELLEN G. WEBSTER.